June 6, 1933.  D. D. DE LOACH  1,913,268
SEMIAUTOMATIC OIL PRESSURE CONTROL CLUTCH
Filed Sept. 21, 1931  2 Sheets-Sheet 2
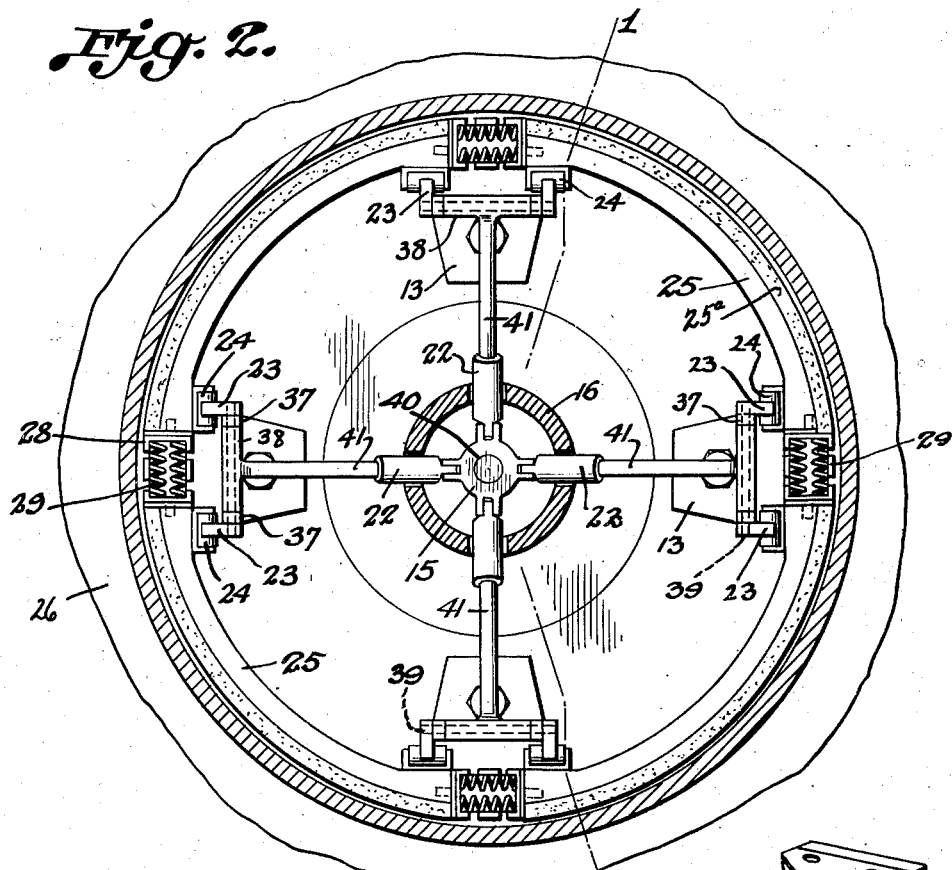
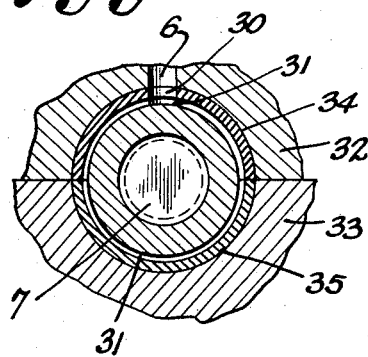
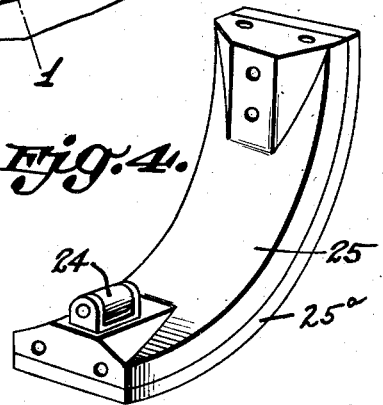
Inventor:
D. D. DeLoach,
by Lester L Sargent
Attorney.

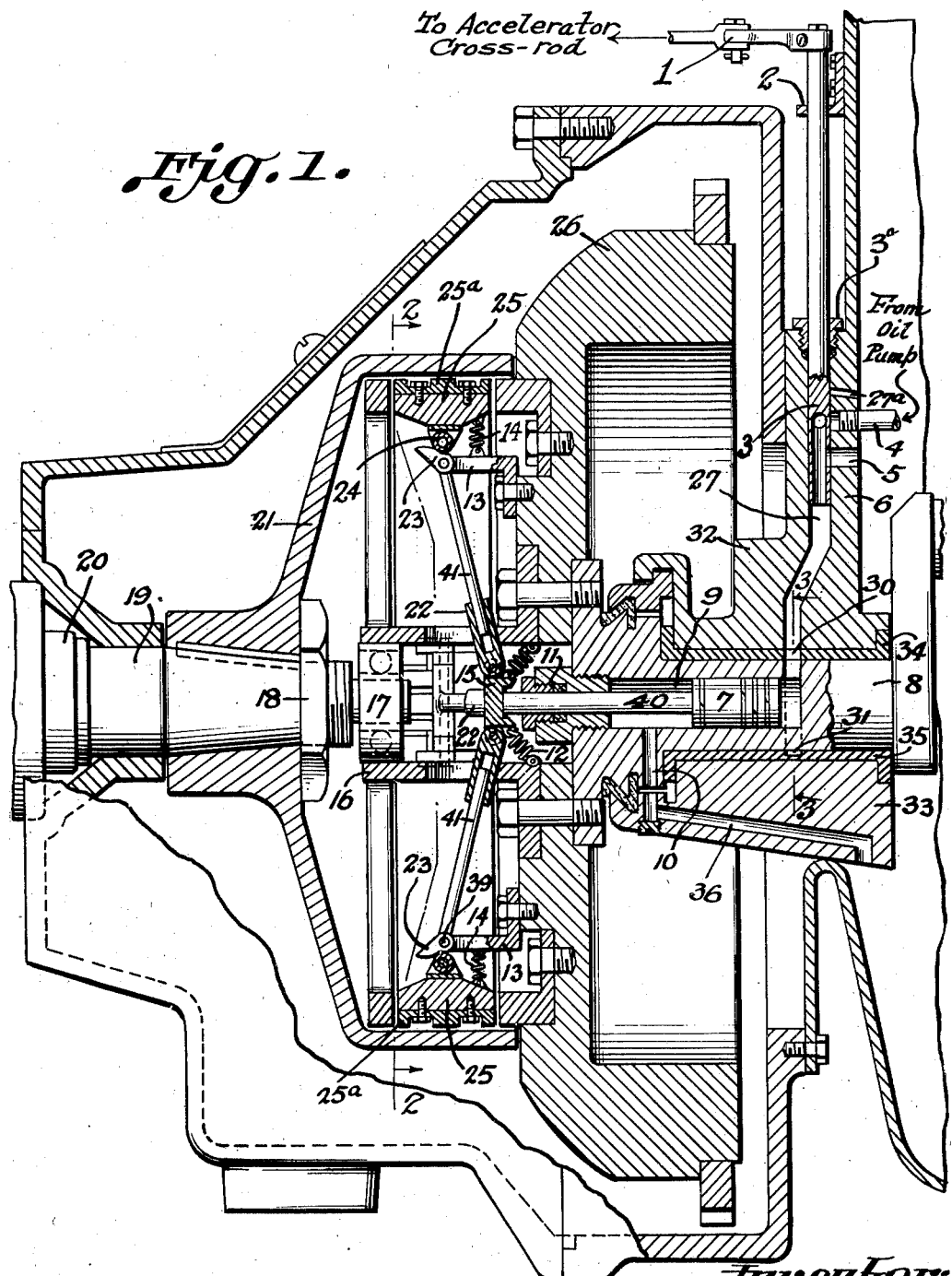

Patented June 6, 1933

1,913,268

UNITED STATES PATENT OFFICE

DOUGLAS D. DE LOACH, OF JACKSONVILLE, FLORIDA

SEMIAUTOMATIC OIL PRESSURE CONTROL CLUTCH

Application filed September 21, 1931. Serial No. 564,175.

The object of my invention is to provide novel clutch mechanism whereby the usual clutch pedal may be entirely eliminated and the clutch control operatively connected with the foot accelerator whereby release of the accelerator will disengage the clutch; to provide a device which will permit of the car being left in gear at all times; to provide a novel oil control piston for operating the clutch mechanism; to provide a novel type of clutch mechanism whereby there is an automatic take-up of the clutch shoes or linings as they become worn; to provide more or less optional free wheeling of the car; to provide mechanism whereby a slipping clutch will warn the driver of the need for oil before the motor will burn up; and to provide a mechanism that will greatly simplify the work of learning to drive by beginners and which will require the use of one foot of the driver in controlling the operation of the car. I attain these and other objects of my invention by the mechanism illustrated in the accompanying drawings, in which—

Figure 1 is a longitudinal section of the invention with parts shown in side elevation;

Fig. 2 is a section on line 2—2 of Fig. 1;

Fig. 3 is a section on line 3—3 of Fig. 1; and

Fig. 4 is a detail perspective view of one of the clutch shoes.

Like characters of reference designate like parts in each of the several views.

Referring to the accompanying drawings, there is suitably attached to the accelerator cross rod a suitable hook-up mechanism which in turn is attached to the oil control valve 3 which is mounted in bracket 2 and the valve portion of which is seated in the oil passage 27 and secured by a suitable stop and packing nut 3a. I provide a suitable oil drain 27a as shown in Fig. 1. Offset openings in the oil control valve 3 are aligned with the inlet conduit 4 from the oil pump and the oil outlet passage 5 conducting oil into the motor casing 6. The oil passage 27 communicates with the oil piston chamber 9 in which the oil piston 7 is slidably mounted within the crank shaft 8 as shown in Fig. 1. I provide an oil drain passage 10 opening out of chamber 9 and communicating with the drain passage 36 in the bottom of the main bearing. I provide a suitable stop and packing nut 11 in which the integral piston rod 40 of piston 7 is slidably mounted. I provide a suitable clutch spider 15 suitably engaged by the piston rod 40 and normally held in retracted position by the pull-back springs 12.

I further provide a plurality of radiating rods pivotally connected with the spider 15, these rods each consisting of a female section 22 and a male section 41, the male section carrying the cam 23 on the end of the rods. I provide stationary braces 13 on which the outer ends of the male section 41 of the spider rods are pivotally mounted. I also provide pull back springs 14 attached to the braces 13 and to the clutch shoes 25 to tend to move the clutch shoes 25 to a position disengaged from the clutch drum 21. Member 16 is the stationary part that supports the clutch shaft pilot bearing and member 17 is the pilot bearing. Member 18 is a lock nut and member 19 is the clutch drive shaft which is connected with the clutch drive shaft transmission bearing 20. The cams 23 engage rollers 24 which are mounted on the clutch shoes 25 as shown in detail in Figs. 1, 2 and 4. Each of the clutch shoes are provided with a suitable lining 25a. Member 26 is the fly wheel, as shown in Fig. 1.

Referring to Fig. 2, I provide a suitable shoe 28 within which are mounted springs 29 which take slack off the clutch shoe.

Referring to Figs. 1 and 3, I provide a bore 30 in top bearing sleeve 34, said bore 30 being aligned with the oil passage 27, for the purpose of furnishing oil pressure against piston 7. I also provide an annular bore or groove 31 in top bearing sleeve 34 and bottom bearing sleeve 35 for the circulation of oil for the purpose of lubricating the crank shaft.

Referring to Figs. 1 and 2, the stationary braces 13 are provided with suitable apertured ears 37 which are aligned with the sleeve 38 on the end of the male section 41 of the spider rods.

I provide a pintle or pivot pin 39 mounted in ears 37 of stationary brace 13 and in the sleeve 38 of the spider rods and engaging the cams 23 as shown in Fig. 2. The pivot pin 39 is tightly mounted in the sleeve 38 and in the cams 23 but loosely mounted in the ears of the stationary braces 13.

The device when applied to a car is adjusted so that there is slight idle motion in the accelerator. Within this range of idle motion the control of the clutch is obtained. In order to obtain free wheeling the foot has to be lifted up right off from the accelerator. When the foot is lightly applied to the accelerator the hook-up mechanism 1 is operated which in turn rotates the oil control valve 3 to admit oil from the oil pump through conduit 4 into the oil passage 27 and thence into chamber 9 and thereby moving the piston 7 and piston rod 40 in a forward direction thereby causing a similar movement of the spider 15 against the tension of the pull-back springs 12 thereby operating the telescopic spider rod elements 22 and 41 to rotate the sleeves 38 and pins 39 tightly mounted in said sleeves and thereby actuate the cams 23 which engage the rollers 24 on the clutch shoes 25 to press the linings 25a of said clutch shoes in contact or operative engagement with the clutch drum 21 as will be understood by referring to Figs. 1 and 2 of the drawings. The oil drain 27a and the oil drain passages 10 and 36 permit of excess oil being returned to the motor casing 6. The pull-back springs 14 and the pull-back springs 12 both function to tend to disengage the clutch shoes 25 and their linings 25a from the clutch drum 21.

While I have shown a rotary oil control valve 3 any suitable type of control valve might be utilized for controlling admission of oil to the oil passage leading to the piston chamber 9. It will also be understood that any hook-up mechanism 1 may be used for operatively connecting the oil control valve with any desired accelerator mechanism such as the conventional accelerator cross rod. The springs 29 which are attached to the shoes 28 which in turn are attached to the ends of the clutch shoes 25, as shown in Fig. 2, tend to take up slack of the clutch shoes, as well as shock when shoes are applied against drum 21.

An advantage of the spider rod mechanism is that it provides an automatic take-up of the clutch shoes or linings. As the shoes wear naturally the piston will have to come in a little further to make the proper seal between the clutch shoe linings 25a and the clutch drum 21. Regardless of the extent to which it has to travel it will still take the same pressure to seal it. This pressure would be regulated by a check valve. As wear reduces the size of the clutch shoe linings and clutch shoes, the device automatically adjusts itself and no repairs are necessary until the brake shoe or clutch lining is worn completely out.

What I claim is:—

1. In a semi-automatic oil pressure controlled clutch, the combination of a crank shaft having an oil chamber in the end thereof, an oil operated piston in said chamber, an oil passage leading to the inner end of said chamber, a radially expansible clutch member operatively connected with and actuated by said piston, a valve for controlling the flow of oil under pressure into said chamber, and hook-up mechanism operatively connecting said valve with a manually controlled element.

2. In a semi-automatic oil pressure controlled clutch, the combination of a crank shaft, an oil chamber in the end of said crank shaft, an oil operated piston in said chamber, an oil passage leading to the inner end of said chamber, a valve for controlling the flow of oil under pressure into said passage, hook-up mechanism operatively connecting said valve with a manually controlled element, a spider operatively engaged by the piston rod, a clutch drum, clutch shoes, means operatively connecting the spider with the clutch shoes, and means normally holding the spider in a retracted position with the clutch shoes disengaged from the clutch drum.

3. In a semi-automatic oil pressure controlled clutch, the combination of a crank shaft, an oil chamber in the end of said crank shaft, an oil operated piston in said chamber, an oil passage leading to the inner end of said chamber, a valve for controlling the flow of oil under pressure into said passage, hook-up mechanism operatively connecting said valve with a manually controlled element, a spider operatively engaged by the piston rod, a clutch drum, clutch shoes, means operatively connecting the spider with the clutch shoes, and pull-back springs normally holding the spider in a retracted position with the clutch shoes disengaged from the clutch drum.

4. In a semi-automatic oil pressure controlled clutch, the combination of a crank shaft, an oil chamber in the crank shaft, an oil operated integral piston and piston rod in said chamber, an oil passage leading to the inner end of said chamber, a valve for controlling the flow of oil under pressure into said passage, hook-up mechanism operatively connecting said valve with a manually controlled element, a spider operatively engaged by the piston rod, a clutch drum, clutch shoes, and means normally holding the clutch shoes in a disengaged position from the clutch drum.

5. In a semi-automatic oil pressure controlled clutch, the combination of a spider, means for actuating the spider, pull-back springs attached to the spider, telescopic rods radiating from and pivotally attached to the spider, cam members on the outer ends of said rods, clutch shoes, rollers carried by the clutch shoes in operative engagement with the cam members, linings on the clutch shoes, and a clutch drum with which the clutch shoes and linings are normally out of engagement when the spider and piston are in their retracted position.

DOUGLAS D. DE LOACH.